Patented July 31, 1934

1,968,722

UNITED STATES PATENT OFFICE 1,968,722

METHOD OF INHIBITING THE CORROSIVE ACTION OF ALKALINE AQUEOUS SOLUTIONS, ETC.

Irwin Stone, New York, N. Y.

No Drawing. Application August 29, 1932, Serial No. 630,905

5 Claims. (Cl. 23—239)

This invention relates to a method of inhibiting the corrosive action of alkaline aqueous solutions, emulsions, and the like on iron containers which may receive the product and to rust-inhibiting solutions, emulsions, etc.

For years, alkaline aqueous emulsions, solutions and the like, such for instance as vanishing cream, latherless shaving creams, library paste, furniture and linoleum polishes, etc., have been packed and sold in glass jars or similar non-metallic containers.

In fact, it has hitherto been deemed impossible to commercially pack in iron receptacles, such products having a high water content, because the contained water attacked the iron producing iron rust which discolored the product, rendering it unsightly and sometimes wholly spoiling the product and making it commercially worthless.

The cost of glass jars is comparatively high, and their weight as compared with metal containers is extremely great and the loss due to breakage is also quite an item.

According to the present invention these and other difficulties are overcome. Other features and advantages will hereinafter appear.

According to the form of the invention herein disclosed there is added to an ordinary aqueous emulsion, solution or cream a small quantity of the nitrite of any one of a number of metals or organic groups. The nitrite of the alkali metals, sodium or potassium, or of the alkaline earth metals barium, strontium or calcium, or of the amyl organic group have all proved useful. As little as 0.1% of the cheap and easily obtained sodium nitrite has proved effective and satisfactory.

Such an emulsion or cream can be stored in an iron container almost indefinitely, thus providing a cheap, strong, and reliable package.

One non-rusting latherless shaving cream was made as follows:

22 lbs. stearic acid
10 lbs. glycerine
1 lb. ammonia (28%)
.1 lb. sodium nitrite
67 lbs. water The stearic acid was first heated to about 85° C. The glycerine and water were then mixed together apart from the stearic acid and also heated to about 85° C. To the glycerine and water were then added the ammonia. This solution was then poured into the stearic acid and thoroughly stirred. When the whole mix was cooled to about 65° C., the sodium nitrite which had previously been dissolved in a small quantity of the water, was added and stirred in the mix until the desired consistency was obtained. A scent may also be added to the mix as and if desired.

Another alkaline emulsion was made from the following formula, for a polishing composition.

| | Percent |
|---|---|
| Carnauba wax | 12 |
| Rosin | 0.5 |
| Triethanolamine oleate | 3.5 |
| Sodium nitrite | 0.1 |
| Water, sufficient to make | 100 |

A solution as a library paste was made from the following formula.

| | Parts |
|---|---|
| Starch | 24 |
| Gum accia | 3 |
| Glycerine | 6 |
| Borax | 0.5 |
| Sodium nitrite | 0.1 |
| Oil of cloves | 0.1 |
| Water | 72 |

While in the examples given above there was used 0.1% of the nitrite, I do not wish to be limited to the use of such proportions for I have found that as much as 3% can be used in some of the products without any deleterious effect or impairment of the product and I have also found that in some cases as little as 0.05% of the nitrite was sufficient to inhibit the rust producing tendency of the product.

Sodium nitrite is usually preferable because it is non-toxic, non-irritating, colorless, odorless, tasteless and inexpensive.

Having thus described certain embodiments of the invention, what is claimed is:

1. In the art of packaging non-acid aqueous manufactured products, the method of inhibiting the otherwise normal tendency of such product to rust tin cans intended to contain it, which consists in incorporating in the product a small quantity of a nitrite.

2. In the art of packaging non-acid aqueous manufactured products, the method of inhibiting the otherwise normal tendency of such product to rust tin cans intended to contain it, which consists in incorporating in the product a small quantity of sodium nitrite.

3. That step in the process of packaging in tin cans, non-acid aqueous emulsions, which consists in incorporating in the emulsion a quantity of a nitrite.

4. That step in the process of packaging in tin cans, non-acid aqueous products, which consists in admixing with the product prior to packaging, a small amount of a nitrite whereby when packaged the product will remain undiscolored.

5. A commercial package comprising a tin can and non-acid aqueous contents containing a small quantity of a nitrite whereby the otherwise normal tendency of such contents to corrode the tin can is inhibited to prevent discoloration of the contents.

IRWIN STONE.